Patented Feb. 27, 1945

2,370,573

UNITED STATES PATENT OFFICE 2,370,573

UNSATURATED ESTERS AND POLYMERS THEREOF

Irving E. Muskat, Akron, and Franklin Strain, Norton Center, Ohio, assignors to Pittsburgh Plate Glass Company, Pittsburgh, Pa., a corporation of Pennsylvania No Drawing. Application December 27, 1941, Serial No. 424,663

6 Claims. (Cl. 260—78)

This invention relates to a new group of unsaturated esters and to the polymers thereof. The new compounds are unsaturated alcohol esters of the theoretical acid

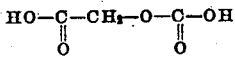

Of particular interest are the esters of unsaturated alcohols which contain three to five carbon atoms and which contain an unsaturated group in an aliphatic chain such as allyl, methallyl, crotyl, isocrotyl, propargyl, isopropenyl, methylpropargyl, ethylallyl and butadienyl alcohols, methyl vinyl carbinol, ethyl vinyl carbinol, methyl allyl carbinol, methallyl carbinol and the corresponding halogen substituted alcohols such as 2-chloroallyl, chlorocrotyl, or 2-bromoallyl alcohols. Esters of alcohols containing six to ten carbon atoms, for example, esters of cinnamyl, phenylpropargyl and propylallyl alcohols, diallyl carbinol, linalool, geraniol, 1-hydroxy-hexadiene-2,4, ethyl isobutenyl carbinol, 1-hydroxy-octene and the halogen substituted products of the same such as chlorocinnamyl alcohol and ethyl chlorallyl carbinol are also very useful as well as the esters of ether alcohols such as allyl cellosolve and methallyl cellosolve.

The esters contain at least one and preferably two groups derived from an unsaturated alcohol. They may be regarded as an ester of (a) a glycolate and (b) an acid ester of carbonic acid. When the acid ester of carbonic acid is an ester of an unsaturated alcohol such alcohol should contain at least three carbon atoms. The glycollic ester may, however, be a vinyl ester or any other unsaturated alcohol ester. In each case esters of alcohols containing up to 10 carbon atoms are particularly desirable. A general formula may be written for the esters as follows:

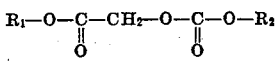

in which $R_1$ and $R_2$ are the radicals derived from unsaturated alcohols.

The new esters may be prepared by reacting a chloroformate of a glycollate such as a salt or an ester of glycollic acid, for example, methallyl glycollate, allyl glycollate, vinyl glycollate, or crotyl glycollate, with an alcohol in the presence of a basic reagent such as pyridine, or other tertiary cyclic amine or an oxide, carbonate or hydroxide of a strongly electronegative metal, to produce the new esters. In accordance with a further method of production a chloroformate of an unsaturated alcohol may be reacted with a glycollate. For example, a polyunsaturated ester may be prepared by reacting allyl chloroformate, methallyl chloroformate, crotyl chloroformate, etc., with an unsaturated ester of glycolic acid such as vinyl, allyl, methallyl, or crotyl glycolate in the presence of an alkaline reagent. Likewise, the chloroformate of an unsaturated glycolate such as allyl glycolate may be reacted with an unsaturated alcohol such as methallyl alcohol in the presence of an alkali.

The reactions are preferably conducted at temperatures between 0° C. and 10° C. and may be conducted in the presence of an inert solvent or diluent such as benzene, chloroform, carbon tetrachloride, etc.

These new unsaturated esters are true chemical compounds having definite boiling and melting points and in many cases, may be recovered by fractional distillation at reduced pressures. On the other hand, some of these materials have such high boiling points that they cannot readily be distilled. Such high boiling materials may be purified by washing the ester or a solution thereof with dilute alkali, dilute acid, and finally with water until water soluble impurities are removed. Volatile impurities may be vaporized by gentle heating under a reduced pressure and the ester may be dried over suitable dehydration agents such as anhydrous sodium sulphate. Solid esters may be purified by crystallizing the ester from suitable solvents.

The unsaturated esters described herein are generally high boiling liquids although some of the esters are solid at normal room temperatures. Most of the liquid esters are clear and colorless and are miscible with numerous organic solvents such as acetone, alcohol, chloroform, dioxane, benzene, xylene, toluene, ethyl ether, paraffin hydrocarbons, etc. The monomeric esters are valuable as plasticizers for various resin materials such as styrene, cellulose, vinyl, urea, protein, phenolic, or acrylic resins and plastics. Other uses such as solvents, insecticides, and liquid coating compositions are noteworthy.

The new compounds polymerize in the presence of heat or light and polymerization catalysts to yield solid or liquid compositions of widely different physical properties. The polymerization is preferably conducted in the presence of catalysts such as oxygen, ozone, or organic peroxides such as lauroyl, benzoyl, or acetone peroxide.

The products of polymerization vary greatly in their physical properties depending upon the molecular structure of the monomer as well as upon the extent of polymerization. The polymers are generally clear and transparent. Monounsaturated esters polymerize to form thermoplastic polymers. On the other hand, the polyunsaturated esters which have two or more unsaturated polymerizable groups, are substantially insoluble and infusible at atmospheric pressure when completely polymerized. Intermediate polymers of the polyunsaturated esters having a wide range of properties may be secured. Upon the initial polymerization of the monomeric polyunsaturated esters or solutions of the monomers in suitable solvents, an increase in the viscosity of the liquids occurs due to the formation of a simple polymer which is soluble in the monomer and in solvents such as acetone, benzene, xylene, toluene, dioxane, or carbon tetrachloride. Upon further polymerization, the liquid sets up to form a soft gel containing a substantial portion of a polymer which is substantially insoluble in the monomer and organic solvents, and containing as well, a substantial portion of soluble material which may be monomer and/or soluble fusible polymer. These gels are soft and bend readily. However, they are fragile and crumble or tear under low stresses. They may be further polymerized in the presence of catalysts to the final infusible insoluble state in which substantially all of the polymer is substantially infusible and substantially insoluble in organic solvents, acids and alkalies.

The monomers of the polyunsaturated esters may be cast polymerized directly to the insoluble, infusible state. This procedure is subject to certain inherent difficulties due to the reduction in volume during the polymerization. The loss of volume or shrinkage causes strains to be established in the hardening gel which frequently result in fractures as the final hard form is attained. It has been discovered that these difficulties may be avoided by releasing the strains established in the gel. This may be done by interrupting the polymerization at an intermediate stage and permitting the strains to be relieved or by conducting the polymerization under conductions which permit gradual release of these strains. For example, the polymerization may be conducted in a simple mold until a soft firm gel has formed. At this point the polymerization may be interrupted and the shaped polymer freed from the mold to which it adheres strongly. When released the polymer contracts substantially, thereby relieving the polymerization strains. The gel may thereafter be shaped, if desired, and polymerized to the final infusible state. Smooth, optically perfect sheets may be made by this method. Preferably, the initial polymerization is conducted at a temperature sufficiently low to prevent the decomposition of the peroxide catalyst. This temperature is dependent upon the catalyst used. For benzoyl peroxide, temperatures of 65 to 85° C. are suitable while for acetone peroxide, temperatures of 140–150° C. may be used. The soft sheet of gel is then freed of the mold and in accordance with one modification, the gel may be coated on both sides with monomer or the syrupy polymer. The coated article is then polymerized between smooth heated plates to the final insoluble state.

In order to inhibit formation of cracks during the initial polymerization, it is frequently desirable to minimize the polymerization on one side of the sheet. This may be done by conducting the polymerization with one side exposed to the air which inhibits polymerization in the presence of a peroxide catalyst such as benzoyl peroxide. By this means a sheet is produced which is hard and smooth on one side while being soft and tacky on the other. The sheet may then be finished by coating the tacky side with monomer or syrupy polymer and polymerizing it in contact with a smooth plate to the insoluble, infusible state. Often it is found desirable to release the polymer from the plate one or more times during polymerization of the coating in order to minimize formation of cracks or other surface defects. Further details of this process may be found in an application for Letters Patent Serial No. 392,111, filed May 6, 1941, by Vincent Meunier, and an application Serial No. 398,241, filed June 16, 1941, by Irving E. Muskat.

Other methods have been developed for polymerization of the polyunsaturated compounds herein contemplated while avoiding formation of cracks and fractures. By one of these methods polymerization may be interrupted or suspended while the monomer-polymer mixture is in the liquid state and before the polymer is converted to a gel by cooling, removal from exposure to ultra-violet light, by adding inhibiting materials such as pyrogallol, hydroquinone, aniline, phenylene diamine, or sulphur, or by destruction of the polymerization catalyst. The fusible polymer may be separated from all or part of the monomer by any of several methods. It may be precipitated by the addition of nonsolvents for the fusible polymer such as water, ethyl alcohol, methyl alcohol, or glycol. Alternatively, it may also be separated from the monomer by distillation in the presence of an inhibitor for polymerization and preferably at reduced pressures. The fusible polymer is thus obtained in stable solid form and as such may be used as a molding powder or may be redissolved in suitable solvent for use in liquid form. It is soluble in organic solvents which are normally capable of dissolving methyl methacrylate polymer or similar vinyl type polymer. Preferably, such polymers are produced by heating the monomer or a solution thereof in the presence of 2–5 percent of benzoyl peroxide until the viscosity of the solution has increased about 100 to 500 percent. This may require several hours while heating at 65 to 85° C. in the presence of benzoyl peroxide. The resulting viscous solution is poured into an equal volume of water, methyl or ethyl alcohol, glycol or other nonsolvent for the fusible polymer. A polymer usually in the form of a powder or a gummy precipitate is thus formed which may be filtered and dried. This permits substantially complete separation of a soluble fusible polymer from unpolymerized monomer.

Often, however, such complete separation may not be desirable since hazy products may be secured upon further polymerization. Accordingly, it is often desirable to produce compositions comprising the fusible polymer and the monomer. This may be effected by partial distillation or extraction of monomer from the polymer or by reblending a portion of the fusible polymer with the same or a different polymerizable monomer. In such a case the composition should contain at least 40 percent and preferably in excess of 50 percent fusible polymer and from about 5 percent to 50 or 60 percent monomer. Preferably, the production of these fusible polymers is conducted by treatment of a solution of the monomer in a solvent for monomer and polymer such as benzene, toluene, carbon tetrachloride, acetone, or other solvent which normally dissolves vinyl polymers.

Other polymerization methods may involve the interruption of the polymerization while the polymer is a gel. For example, a soft solid gel containing a substantial proportion of fusible polymer may be digested with a quantity of solvent for the fusible polymer to extract the fusible gel from the infusible. The solution may then be treated as above described to separate the fusible polymer from the solvent. These polymers may be used as molding or coating compositions. Due to their solubility they are particularly desirable for use in paint compositions.

Other fusible polymers may be prepared by carrying the initial polymerization to the point where the polymer is in the form of a gel which generally contains at least 20 percent and preferably about 45 to 80 percent by weight of substantially insoluble polymer but at which point the gel is still fusible. This solid resin composition may be disintegrated to a pulverulent form and used as a molding powder. Alternatively, a desirable polymer may be prepared by emulsifying the monomer or a syrupy polymer in an aqueous medium with or without a suitable emulsification agent such as polyvinyl alcohol, polyallyl alcohol, polymethallyl alcohol, etc., and then polymerizing to the point where the gel precipitates. This polymer may be separated and used as molding powder.

The solid or semisolid fusible polymers may be used as molding compositions to form desirable molded products which may be polymerized to a thermohardened state. Preferably, the molding is conducted in a manner such that the polymer fuses or blends together to form a substantially homogeneous product before the composition is polymerized to a substantially infusible state. This may be effected by conducting polymerization at an elevated temperature and/or pressure in the presence of one to five percent of benzoyl peroxide, generally in a heated mold. The polymers may be mixed with fillers such as alpha cellulose, wood pulp and other fibrous substances, mineral fillers or pigments such as zinc oxide or calcium carbonate, lead chromate, magnesium carbonate, calcium silicate, etc.; plasticizers such as the saturated alcohol esters of phthalic acid, camphor, the saturated alcohol esters of maleic, fumaric, succinic, and adipic acids, or di- or triethylene glycol bis (butyl carbonate). The polymeric molding powder may be copolymerized with phenolic, cellulose acetate, urea, vinylic, protein, or acrylic resins. It is thus possible to produce transparent or opaque forms of a wide variety of colors and hardnesses, depending upon the proper selection of the modifying agents.

The fusible polymers may be dissolved in suitable solvents and used as coating and impregnating compositions. For example, the solution or dispersion of fusible polymer in monomer or other organic solvent such as benzene, toluene, chloroform, acetone, dioxane, carbon tetrachloride, phenyl cellosolve, dichlorethyl ether, dibutyl phthalate, or mixtures thereof, is useful as a liquid coating composition. Objects of paper, metal, wood, cloth, leather, or synthetic resins may be coated with the solution of polymer in solvent and subsequently polymerized to yield attractively finished coatings. Similarly, porous objects of felt, cloth, leather, paper, etc., either in single layers or laminated may be impregnated with the dissolved fusible polymer and subjected to the polymerization to the final insoluble, infusible state.

The following examples are illustrative:

Example I

A 130 gm. sample of methallyl glycolate was cooled to 0° C. on an ice bath. Phosgene was passed in at a rate of 20 to 30 millimoles per minute for one hour. The temperature remained between 2° C. and 15° C. throughout the reaction. The reaction mixture was warmed to 30° C. to evolve the excess phosgene. One mole (72 gms.) of methallyl alcohol and 80 gms. of pyridine were mixed in a reaction flask. The mixture was cooled to 0° C. and the chloroformate of methallyl glycolate was added dropwise while the temperature was maintained below 15° C. The addition was completed in about 45 minutes, during which time the mixture was stirred continuously. The reaction mass was acidified to the methyl orange end point using an external indicator. The liquid ester was washed with water, dilute hydrochloric acid, dilute Na$_2$CO$_3$, and finally again with water. It was purified by distillation at 2 mm. total pressure. The ester was a colorless high boiling liquid. This compound has the following probable structure:

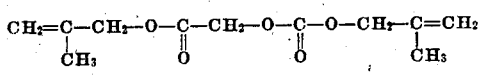

A quantity of the ester containing 5 percent benzoyl peroxide polymerized upon heating at 75° C. for one hour, a hard, clear polymer being produced.

Example II

A mixture of 116 gms. of allyl glycolate and 100 gms. of pyridine was cooled to 0° C. on an ice bath. 80 gms. of allyl chloroformate were added dropwise at a rate which permitted the reaction temperature to be maintained below 10° C. During the addition the mixture was continually stirred. When the addition was complete the mixture was stirred an additional half-hour. The ester was washed with dilute acid and water and was purified by distillation at reduced pressure. The resulting ester was a colorless high boiling liquid having the following structure:

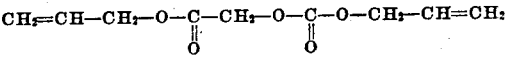

A five gram sample was polymerized to a fusible gel which contained approximately 60 percent acetone insoluble material by heating at 75° C. in the presence of 4 percent benzoyl peroxide until a solid gel was obtained. The fusible gel was then ground to a powder and pressed in a mold at 125° C. at a pressure of 2000 pounds per square inch whereby a hard, transparent polymer was produced.

Example III

A mixture of 100 gms. of pyridine and 116 gms. of allyl glycolate was prepared and 130 gms. of methallyl chloroformate was added slowly while the temperature was maintained between +5 and +18° C. The product was purified as in Example I. The resulting ester is a colorless liquid believed to have the molecular constitution:

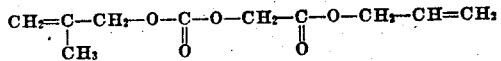

It was freed of impurities by washing with water and dilute HCl and separated from the benzene by distillation at reduced pressures. The product was a colorless high boiling liquid. A five gram sample was polymerized readily by heating to 75° C. for one hour in the presence of 5 percent benzoyl peroxide to form a hard clear polymer.

Example IV

A mixture of 300 cc. of benzene, 58 gms. of allyl glycollate and 50 gms. of pyridine was prepared in a flask equipped with dropping funnel and stirring device. The mixture was cooled to 0° C. on an ice bath and 47 gms. of methyl chloroformate was added at a slow rate such that the temperature of reaction maintained below +10° C. at all times. The addition was begun at a relatively slow rate but faster addition was possible as the reaction approached completion. All of the methyl chloroformate was added after ¾ hour but the mixture was permitted to stand for ½ hour. The benzene solution was washed with water, dilute acid and again with water and dried over calcium sulphate. The ester

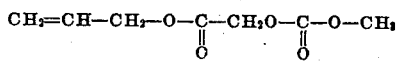

was separated from the benzene by distillation. The product was a colorless liquid.

Example V

Thirty gms. of the allyl glycollate-allyl carbonate ester described in Example II was mixed with 2 percent benzoyl peroxide and heated at 90° C. until the viscosity has approximately tripled. The partly polymerized liquid was poured into 100 cc. of methyl alcohol causing a separation into solid and liquid phases. A soft gummy polymer was recovered by decantation and filtration and was dried under a superatmospheric pressure. This polymer was heated to 110° C. for two hours in a mold under 1500 lb. pressure. A hard colorless polymer resulted.

Example VI

Using the procedure described in Example IV, ethyl glycollate and allyl chloroformate were reacted to produce an unsaturated ester having the molecular structure:

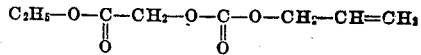

300 gms. of this mixture were mixed with 5 percent benzoyl peroxide and with 200 gms. of finely divided magnesium carbonate in a ball mill for 8 hours. The molding powder thus prepared was dry and pulverulent. When pressed in a mold at a temperature of 115° C. and a pressure of 5000 lbs. per square inch, a hard, sound, white, and slightly translucent resin product was obtained.

It should be noted also that while the invention has been described with particular reference to glycollic esters, other glycollates such as the sodium, potassium, calcium, or other salts may be used to produce compounds having desirable characteristics. These compounds may be polymerized to form water-soluble polymers. Likewise, the amides of glycollic acid may be treated in accordance with the present invention.

This case is a continuation-in-part of application for United States Letters Patent Serial Nos. 392,103, filed May 6, 1941, and 361,280, filed October 15, 1940, by Irving E. Muskat and Franklin Strain.

Although the present invention has been described with reference to specific examples, it is not intended that the scope of the invention shall be limited thereby, except as expressly described in the following claims.

We claim:

1. An ester of (a) allyl glycolate and (b) allyl acid carbonate.
2. An ester of (a) methallyl glycolate and (b) methyallyl acid carbonate.
3. A polymer of an ester of (a) allyl glycollate and (b) allyl acid carbonate.
4. A polymer of an ester of (a) methallyl glycollate and (b) methallyl acid carbonate.
5. A neutral ester of (A) an hydroxy ester of (a) glycolic acid and (b) an unsaturated monohydroxy alcohol of up to ten carbon atoms and an unsaturated linkage in an aliphatic straight chain and (B) an acid ester of (a) carbonic acid and (b) a monohydroxy alcohol having three to ten carbon atoms and an unsaturated linkage in an aliphatic straight chain.
6. A polymer of the compound defined in claim 5.

IRVING E. MUSKAT.
FRANKLIN STRAIN.